United States Patent [19]

Abayasekara et al.

[11] Patent Number: 5,352,511
[45] Date of Patent: Oct. 4, 1994

[54] HYDROPHILIC COMPOSITIONS WITH INCREASED THERMAL RESISTANCE

[75] Inventors: Dilip R. Abayasekara, Newark; Robert L. Henn, Wilmington, both of Del.

[73] Assignee: W. L. Gore & Associates, Onc., Newark, Del.

[21] Appl. No.: 153,339

[22] Filed: Nov. 15, 1993

[51] Int. Cl.$^5$ .......................... B32B 5/18; B32B 33/00
[52] U.S. Cl. .................... 428/308.4; 55/522; 210/506; 210/510.1; 428/421; 428/422
[58] Field of Search .............. 428/308.4, 421, 422; 55/522; 210/506, 510.1

[56] References Cited

U.S. PATENT DOCUMENTS 5,130,024  7/1992  Fujimoto et al. ............... 210/500.36

*Primary Examiner*—James C. Cannon
*Attorney, Agent, or Firm*—Gary A. Samuels

[57] ABSTRACT

A fluid filtration material made of a porous substrate, e.g. a membrane or a fabric, that is coated with a fluorinated copolymer that contains recurring vinyl alcohol units that have been reacted with a monoepoxide to aid in preventing loss of hydrophilicity in the coated material.

8 Claims, No Drawings

HYDROPHILIC COMPOSITIONS WITH INCREASED THERMAL RESISTANCE

FIELD OF THE INVENTION

This invention relates to substrates such as films or fabrics and the like, rendered hydrophilic by the presence of a hydrophilic coating on the substrate and especially to porous structures useful in filtration.

BACKGROUND OF THE INVENTION

Recently, a hydrophilic porous fluoropolymer membrane was disclosed in U.S. Pat. No. 5,130,024. In this patent, normally hydrophobic fluoropolymer membrane is rendered hydrophilic by coating the pores with a hydrophilic fluorine-containing copolymer. Increasing the hydrophilicity of filtration membranes increases their efficiency in filtration applications involving filtering aqueous compositions. A typical such copolymer taught by this patent is a copolymer of a) a monomer of the formula CXY=CFZ where Z can be fluorine or hydrogen, and X and Y can be H, F, Cl or $CF_3$ (preferably they are all F), and b) a monomer of the formula

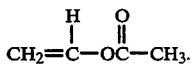

This copolymer, after saponification of the acetate group to hydroxyl, is coated on the pores of the membrane to provide hydrophilicity to the membrane. The coating is durable because of the fluorocarbon attraction between the membrane $CF_2$ groups and the copolymer CF bonds. Hydrophilicity is provided by the conversion of the

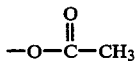

(acetate) side groups in the copolymer to —OH groups, thus forming vinyl alcohol recurring units in the copolymer chain. This copolymer will be referred to hereinafter sometimes as the VOH copolymer.

The VOH copolymer coating on hydrophobic substrates increases their surface free energy significantly. This makes such coated substrates spontaneously wettable by high surface tension liquids such as water, which consequently opens up the use of such substrates to aqueous filtration applications. Some other potential applications are in the area of increased adhesion to high surface energy substrates, and use in biomedical devices, among others.

While the potential for such applications is promising, hydrophilicity of the VOH-copolymer coating suffers from lack of heat resistance at temperatures above 120° C.

When a VOH-copolymer coated membrane is heated at 120° C. and above, it has been observed that the water-wettability of the substrate becomes reduced, i.e., it is either no longer water-wettable or it requires a longer contact time with water or a higher contact pressure in order to become fully wet. Steam sterilization at 120° C. for 0.5 hour also has such a deleterious effect on the water-wettability of the VOH-copolymer coated substrates. Analysis via nuclear magnetic resonance spectroscopy as well as infrared spectroscopy of the VOH-copolymer before and after heating demonstrates that the loss of water-wettability upon heating is not caused by a chemical change in the VOH-copolymer. This leaves the possibility that the deleterious effect on water-wettability is caused by a physical change of the VOH-copolymer. This change could be in the form of C-OH bond rotations. If the hydroxy groups are rotated away from the surface of the substrate into its bulk, the hydroxy groups will no longer be in the optimum orientation for "receiving" and hydrogen bonding with incoming water.

SUMMARY OF THE INVENTION

In this invention, the above problem has been solved by attaching a bulky group to the hydroxy function. Although hydroxy functions are consumed in this reaction, due to the nature of the reactant used, a new hydroxy group can be generated for every hydroxy function consumed. The purpose of the reactions are to generate pendent hydroxy groups that are bonded to bulky groups. The belief is that hydroxy functions bonded to bulky groups will require higher energies to rotate from one side of the polymer backbone to the other, and thus preserve water wettability after exposure to elevated temperatures.

Thus in this invention a hydrophilic composition is provided comprising a substrate, preferably having continuous pores through it, in which at least a portion of the substrate is coated with a copolymer, wherein vinyl alcohol units in the copolymer are reacted with a monofunctional epoxide compound.

Preferably the substrate is a microporous fluorocarbon membrane.

Any epoxide of the formula $CH_2$—CH—R wherein R is an organic moiety containing 4 or more carbon atoms is effective, but larger groups are more effective as long as the epoxide can be dissolved in the same solvent as the VOH copolymer.

DESCRIPTION OF THE INVENTION

The substrate is preferably permeable and can be any material that allows fluids, liquid or gas, to pass through. It is a material that contains continuous passages extending through the thickness of the material, and openings on both sides. These passages can be considered as interstices or pores. Preferably the material is flexible and is in the form of a fabric, sheet, film, tube, mesh, fiber, plug, or the like. The material can also be a porous synthetic or natural polymeric film or membrane, where the pores form the interstices or passageways. Representative polymers useful in the material include polyamide, polyurethane, polyester, polycarbonate, polyacrylic, polyolefins such as polyethylene and polypropylene, or fluorinated polymers such as polyvinylidene fluoride or polytetrafluoroethylene, polyvinyl chloride and the like. The material will generally be from about 1 to about 200 micrometers thick. In order to promote adherence of the coating to the substrate, the coating should have groups or moieties that have an affinity for the substrate. In other words, if the substrate contains fluorocarbon groups, then a coating material that contains fluorocarbon groups will be more likely to adhere and be an effective coating. Preferably, the substrate is expanded porous polytetrafluoroethylene (ePTFE) sheet made as described in U.S. Pat. No. 3,953,566 by stretching PTFE resin. The resulting product has a microstructure of nodes interconnected with fibrils. The PTFE resin is stretched so that the micropores or voids that form allow for good gas or air flow while providing liquid water resistance. These porous PTFE sheets, which can be referred to as membranes or fibers preferably have a Gurley number of between 0.1 second and 80 seconds, depending on pore size and pore volume.

When the material is polytetrafluoroethylene it will have a porosity volume ranging usually from 15% to 95%, preferably from 50% to 95%.

The copolymers used to coat the substrate can be made by first copolymerizing a fluorine-containing ethylenically unsaturated monomer and a non-fluorinated vinyl acetate, followed by converting the acetate to hydroxyl by saponification. The resulting copolymer is subsequently reacted with a monoepoxide.

The fluorine-containing ethylenically unsaturated monomer will be a vinyl monomer such as, for example, tetrafluoroethylene, vinyl fluoride, vinylidene fluoride, monochloro-trifluoroethylene, dichlorodifluoroethylene, hexafluoropropylene, perfluoropropylvinyl ether, and the like. Preferably, the fluorine-containing vinyl monomer can be described as $XCY=CFZ$ wherein $Z$ can be fluorine or hydrogen and $X$ and $Y$ can each be selected from hydrogen, fluorine, chlorine, or —$CF_3$.

Once the vinyl acetate-containing copolymer is prepared, the acetate groups are saponified to hydroxyl groups. In this case, not all of the acetate groups contained in the copolymer need be replaced by hydroxyl groups. The conversion of acetate groups into hydroxyl groups need only be carried out to the extent needed to provide the copolymer with hydrophilic properties.

The fluorine content of the fluorine-containing hydrophilic copolymer to be used as the coating in the present invention may range usually from 2% to 40%, preferably from 10% to 40%, and most preferably 20%–30% on a weight basis. If the fluorine content of the fluorine-containing hydrophilic copolymer becomes too high, the hydrophilic properties of the polymer may be lessened.

Representative monoepoxides include glycidyl isopropyl ether, i.e.,

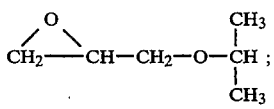

t-butyl glycidyl ether, 1-oxaspiro(2.5)octane, styrene oxide, or the like. The formula of the oxaspiro octane is

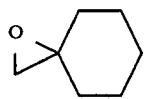

These epoxides can react with the —OH of the VOH copolymer with no net loss of —OH moieties, since the epoxide rings open to form —OH groups.

The coated compositions of the invention may be prepared by dissolving the VOH copolymer, the epoxide, and catalyst in an organic solvent, such as methyl alcohol, and then applying the solution to the porous substrate by immersion or spraying or transfer coating. The coated product is then dried in an oven, e.g. at about 80° C., or can be air-dried. Reaction of copolymer with the epoxide occurs during the drying process.

Suitable solvents are those which will dissolve the copolymer, e.g. alcohols.

In the following examples, the copolymer employed was a copolymer of tetrafluoroethylene and vinyl alcohol of approximately 25% (by weight) alcohol functionality.

EXAMPLE 1

A treatment solution was prepared which contained, by weight, 1% TFE/VOH, 0.43% glycidyl isopropyl ether, 0.2% potassium hydroxide in methanol/ethanol (4:1).

Sample 1.1: A microporous PTFE laminate obtained from W. L. Gore & Associates, Inc., with an average nominal pore size of 0.45 microns was immersed in the above solution for 5 minutes. It was then placed in a vacuum oven at 65°–70° C., 30 inches mercury pressure for 10 minutes.

Sample 1.2: A microporous PTFE laminate with an average nominal pore size of 0.1 microns was immersed in the treatment solution for 5 minutes. It was then placed in a vacuum oven at 65°– 70° C., 30 inches mercury, for 10 minutes.

Both samples were immediately and completely wettable in water. Water wettability was determined by immersion in water. A transparent material indicated good water wettability.

Testing the Durability of Water-wettability to Steam Heat

Both the above samples were autoclaved at 120° C. for 90 minutes. After autoclaving, both samples were completely water-wettable. Prior experience had demonstrated that TFE/VOH coated microporous PTFE would lose water-wettability in autoclave conditions such as the above.

Testing the Durability of Water-wettability to Dry Heat

Portions of Sample 1.1 were separately heat tested in a vacuum oven. Temperatures of testing were 120° C., 150° C., 160° C. Heat exposure time was 5 minutes in each case. Water-wettability of the materials after this exposure to dry heat was complete and immediate.

EXAMPLE 2

Control Sample 2.1: A microporous PTFE laminate of 1 micron average nominal pore size was immersed in a 1% TFE/VOH solution (solvent: methanol/ethanol 4:1) for 1 minute. It was then dried at room temperature overnight.

Sample 2.2: The treatment solution was 1% TFE/VOH, 1.9% tert-butyl glicidyl ether, 0.1% potassium hydroxide in methanol/ethanol (4:1). an untreated sample of the same 1 micron average nominal pore size PTFE laminate as mentioned in Sample 2.1 was immersed in this solution for 1 minute. Reaction and drying occurred at room temperature overnight.

Being unheated at this point, both samples were completely and immediately water-wettable.

Testing the Durability of Water-wettability to Dry Heat

Each sample was cut into test strips. Each test strip was subjected to heating at a specific temperature in an oven. Time of exposure to heat for each test strip was 15 minutes. After removing the heated test strips from the oven, the water-wettability of each test strip was measured by placing several 25 microliter water droplets (administered by a pipette) on the surface of the strip and measuring the time required for the areas of contact between PTFE and water to become completely transparent. The results were as follows:

| Sample No. | Temperature (°C.) | Water-wettability After Dry Heat |
|---|---|---|
| 2.1 | 120 | Complete in 60 seconds |
| 2.2 | 120 | Immediate and complete |
| 2.1 | 130 | Only partially wet up to 300 seconds |
| 2.2 | 130 | Complete in 11 seconds |
| 2.1 | 140 | Only partially wet up to 300 seconds |
| 2.2 | 140 | Completely wet in 100 seconds |
| 2.1 | 150 | Hardly any wetting up to 300 seconds |
| 2.2 | 150 | Complete in 120 seconds |
| 2.1 | 160 | No wetting up to 300 seconds |
| 2.2 | 160 | No wetting up to 300 seconds |

EXAMPLE 3

Control Sample 3.1: A microporous PTFE laminate of 1 micron average nominal pore size was immersed in a 1% TFE/VOH solution (solvent: methanol/ethanol 4:1) for 1 minute. It was then dried at room temperature overnight.

Sample 3.2: The treatment solution was 1% TFE/VOH, 0.81% 1-oxaspiro(2.5)octane, 0.04% potassium hydroxide in methanol/ethanol (4:1). An untreated microporous PTFE laminate (the same as used for Sample 3.1) was immersed in this solution for 1 minute. The reaction and drying was left to occur at room temperature overnight.

Being unheated at this point, both samples were completely and immediately water-wettable.

Testing the Durability of Water-wettability to Dry Heat

Each sample was cut into test strips. Each test strip was heated at a specific temperature in an oven. Time of heating of each test strip was 15 minutes. After removing the heated test strips from the oven, the water-wettability of each test strip was measured by placing several 25 microliter water droplets (administered by a pipette) on the surface of the strip and measuring the time required for the areas of contact between PTFE and water to become transparent. The results were as follows:

| Sample No. | Temperature (°C.) | Water-wettability After Dry Heat |
|---|---|---|
| 3.1 | 120 | Complete in 60 seconds |
| 3.2 | 120 | Immediate and complete |
| 3.1 | 130 | Only partially wet up to 300 seconds |
| 3.2 | 130 | Complete in 2 seconds |
| 3.1 | 140 | Only partially wet up to 300 seconds |
| 3.2 | 140 | Completely wet in 10 seconds |
| 3.1 | 150 | Hardly any wetting up to 300 seconds |
| 3.2 | 150 | Complete in 10 seconds |
| 3.1 | 160 | No wetting up to 300 seconds |
| 3.2 | 160 | Complete in 60 seconds |

I claim:

1. A hydrophilic, fluid permeable composition comprising a substrate having continuous pores through it in which at least a portion of the interior of the substrate is coated with a copolymer of a fluorinated ethylenically unsaturated monomer and vinyl alcohol, wherein the vinyl alcohol units have been reacted with a monofunctional epoxide.

2. The composition of claim 1 in which the substrate is flexible and is in the form of a fabric, sheet, film, tube, mesh or plug.

3. The composition of claim 2 in which the substrate is comprised of a synthetic polymer or natural polymer.

4. The composition of claim 1 in which the substrate is comprised of a fluoropolymer.

5. The composition of claim 4 in which the fluoropolymer is polytetrafluoroethylene.

6. The composition of claim 1 in which the fluorinated ethylenically unsaturated monomer in the copolymer is tetrafluoroethylene.

7. The composition of claim 1 wherein the monoepoxide is selected from the class consisting of glycidyl isopropyl ether, t-butyl glycidyl ether, 1-oxaspiro(2.5)octane, and styrene oxide.

8. The composition of claim 1 wherein the monoepoxide is 1-oxaspiro(2.5) octane.

* * * * *